United States Patent [19]

Matsuda et al.

[11] Patent Number: 5,109,082

[45] Date of Patent: Apr. 28, 1992

[54] PROCESS FOR PRODUCING CIS-1,4-POLYBUTADIENE WITH GELATION INHIBITED

[75] Inventors: Teruhiko Matsuda, Tokuyama; Terutaka Yao, Hachioji; Yasunori Mihara; Nobuhide Hada, both of Tokuyama, all of Japan

[73] Assignee: Nippon Zeon Co., Ltd., Tokyo, Japan

[21] Appl. No.: 736,067

[22] Filed: Jul. 25, 1991

[30] Foreign Application Priority Data

Jul. 26, 1990 [JP] Japan .................... 2-198713

[51] Int. Cl.$^5$ .................... C08F 2/06; C08F 136/06
[52] U.S. Cl. ............................ 526/93; 526/91; 526/138; 526/139; 526/140; 526/142; 526/335
[58] Field of Search ............ 526/93, 91, 94, 86, 526/138, 139, 140, 142

[56] References Cited

U.S. PATENT DOCUMENTS

| 4,182,814 | 1/1980 | Bernemann et al. | 526/340.4 X |
| 4,314,045 | 2/1982 | Odar | 526/93 |
| 4,579,920 | 4/1986 | Tsujimoto et al. | 526/340.4 X |

FOREIGN PATENT DOCUMENTS 1092477 11/1967 United Kingdom .................. 526/93

Primary Examiner—Fred Teskin

[57] ABSTRACT

In a process for producing cis-1,4-polybutadiene by polymerizing 1,3-butadiene in an inert organic solvent in the presence of a catalyst comprising a halogen-containing organoaluminum compound, a transition metal compound and water, the improvement wherein a necessary amount of water is passed through a porous filter having a pore diameter of 5 microns or less, and then dispersed in the inert organic solvent or an inert organic solvent of 1,3-butadiene.

5 Claims, No Drawings

PROCESS FOR PRODUCING CIS-1,4-POLYBUTADIENE WITH GELATION INHIBITED

This invention relates to a process for producing cis-1,4-polybutadiene in the presence of a polymerization catalyst comprising a halogen-containing organoaluminum compound, a transition metal compound and water while inhibiting formation of a gelled polymer and adhesion of scales to a polymerization reactor.

A process is known for producing 1,4-polybutadiene by polymerizaing 1,3-butadiene in the presence of a polymerization catalyst comprising a halogen-containing organoaluminum compound, a transition metal compound and water. The use of water increases a polymerization activity but results in formation of a large amount of a gelled polymer (hereinafter simply referred to as a "gel"). The large amount of the formed gel adheres to a polymerization reactor, a stirrer or a piping and makes it impossible to continue the polymerization reaction over a long period of time. Moreover, as the resulting polybutadiene contains the gel, its usage is limited.

Water as a catalyst component can be added to a polymerization system using butadiene having water dissolved therein or an inert organic solvent. However, for water to reach a given amount, there is a need for conjointly using anhydrous butadiene or an anhydrous inert organic solvent, and the operation becomes complex. Accordingly, this process is ordinarily not used.

Ordinarily used is a process in which water is added to a polymerization solvent or a polymerization solvent solution of 1,3-butadiene and dispersed with stirring. This process is simple but heavily forms a gel. Its improvement is therefore demanded.

A process is proposed in which gelation is inhibited using as a gelation inhibitor a hydroquinone-type or phenolic compound (Japanese Patent Publication No. 15765/1982) or a thiodipropionic acid diester (Japanese Patent Publication No. 9756/1968). These inhibitors are effective indeed if used in large amounts, but decrease a polymerization activity, so that a polymerization catalyst has to be used in a large amount. Moreover, the above inhibitors have an adverse effect on qualities (vulcanization behavior, etc.) of the resulting polybutadiene.

In view of the above background, an object of this invention is to improve an ordinary polymerization process in which water is used as a catalyst component by dispersing it in a polymerization solvent, etc. and to develop a process for producing cis-1,4-polybutadiene with gelation inhibited.

The present inventors have made assiduous investigations to achieve the above object, and consequently found that gelation is inhibited by passing a necessary amount of water through a porous filter and then dispersing it in an inert organic solvent as a polymerization solvent or an inert organic solvent solution of 1,3-butadiene and that on that occasion, an outstanding gelation inhibiting effect is provided by adding a small amount of the gelation inhibitor to a reaction system without increasing the amount of the polymerization catalyst.

Thus, in accordance with this invention, there is provided a process for producing cis-1,4-polybutadiene by polymerizing 1,3-butadiene in an inert organic solvent in the presence of a catalyst comprising a halogen-containing organoaluminum compound, a transition metal compound and water, characterized in that a necessary amount of water is passed through a porous filter having a pore diameter of 5 microns or less, and then dispersed in the inert organic solvent or an inert organic solvent solution of 1,3-butadiene.

The polymerization process of this invention is characterized in that water as a catalyst component is passed through the porous filter before being dispersed in the polymerization solvent or the polymerization solvent solution of 1,3-butadiene.

The polymerization catalyst used in this invention is a known catalyst.

Examples of the halogen-containing organoaluminum compound include dialkylaluminum monochlorides such as diethylaluminum monochloride and diisobutylaluminum monochloride. The amount of the halogen-containing organic compound is usually 0.2 to 1.5 mmols per mol of 1,3-butadiene.

Examples of the transition metal compound are, for example, cobalt and nickel compounds. The cobalt compound is especially desirable. Examples of the cobalt compound include cobalt acetylacetonate, cobalt octoate, cobalt naphthonate and cobalt benzoate. Any compounds will do if soluble in the polymerization solvent. The amount of the transition metal compound is usually 0.003 to 0.02 mmols per mol of 1,3-butadiene.

Water is a necessary component for stably improving a catalytic activity. The amount of water is usually 0.1 to 0.8 mol per mol of the halogen-containing organoaluminum compound.

In this invention, unlike the ordinary processes, water passed through the porous filter is dispersed as a catalyst component in the polymerization solvent or the polymerization solvent solution of 1,3-butadiene, and the halogen-containing organoaluminum compound is then dispersed therein.

The porous filter used in this invention has preferably a pore diameter of 5 microns or less. When the pore diameter exceeds 5 microns, the gelation inhibiting effect goes insufficient. It is more preferably 2 microns or less. The material of the porous filter is not limited in particular. Stainless steel, brass, nickel-based alloy, carbon, graphite, alundum and ceramics are preferable. The porous filter is obtained by sintering these materials.

Water may be passed through the filter either alone or together with the other inert organic solvent soluble in the inert organic solvent which will be later described. In the latter case, the gelation inhibiting effect is more improved. The term "together with the inert solvent" means that water and said solvent are passed through the filter simultaneously or water is passed through the filter in the form of a solution in which water is dissolved in said solvent.

Examples of the preferable inert organic solvent include alcohols such as methanol, ethanol, n-propanol, iso-propanol, tert.-butanol and ethylene glycol, and ethers such as tetrahydrofurane, dioxane and butyl cellosolve. In consideration of an influence on the polymerization reaction, qualities of polybutadiene, etc. it is advisable that the amount of the inert solvent is less than that of water used.

The gelation inhibiting effect is thought to be related to the dispersed state of water. When the dispersed state of water is good, the polymerization system (the polymerization solvent solution of 1,3-butadiene) is a colorless or pale yellow clear solution. However, when the dispersed state of water is bad, the polymerization system becomes turbid or the precipitate is formed because of the formation of aluminum hydroxide.

The inert organic solvent as the polymerization solvent is not limited in particular if dissolving cis-1,4-polybutadiene and having no adverse effect on the activity of the catalyst. Preferable examples of the inert organic solvent include aromatic hydrocarbons such as benzene, toluene and xylene; alicyclic hydrocarbons such as cyclohexane, methylcyclohexane and cyclopentane; and aliphatic hydrocarbons such as n-butane, n-hexane and n-heptane. They may be used either singly or in combination.

In the polymerization process of this invention, an ordinary molecular weight modifier can be used in a suitable amount if required. Examples of the molecular weight modifier include non-conjugated dienes such as allene, 1,2-butadiene, 1,2-pentadiene, 1,5-cyclooctadiene, and alpha-olefins such as ethylene, propylene and butene-1.

In this invention, the gelation inhibitor is added to the polymerization system if required to further improve the gelation inhibiting effect. Examples of the gelation inhibitor include thiopropionic acid diesters (Japanese Patent Publication No. 9756/1968); known gelation inhibitors such as 4,4-thiobis(3-methyl-6-tert.-butylphenol) and 2,5-di-tert.-butylhydroquinone and 2,5-di-tert.-amylhydroquinone (Japanese Patent Publication No. 15765/1982); phosphoric acid triester compounds such as trimethyl phosphate, triethyl phosphate and triphenyl phosphate; phosphorous acid triester compounds such as trimethyl phosphite, triethyl phosphite, tributyl phosphite, triphenyl phosphite and tris(nonylphenyl) phosphate; thiourea compounds such as thiourea, N,N-diethylthiourea, N,N-dibutylthiourea and N,N-diphenylthiourea; thiols such as n-octylmercaptane, n-dodecylmercaptane, tert.-dodecylmercaptane and 2-mercaptobenzothiazole; orthoesters such as trimethyl orthoformate, triethyl orthoformate, trimethyl orthoacetate, triethyl orthoacetate, trimethyl orthobutyrate and triethyl orthobutyrate; phenylphosphonic acid diesters such as dimethyl phenylphosphonate and diethyl phenylphosphonate. The amount of the gelation inhibitor is usually about 0.002 to 0.06 mmols per mol of 1,3-butadiene. Though such gelation inhibitor is used, the polymerization activity is not decreased in this invention; it is unnecessary to increase the amount of the catalyst.

In this invention, the polymerization is performed at a temprature of usually 5° to 80° C., preferably 15° to 70° C. When a given conversion is reached, the polymerization reaction is stopped in a usual manner, the catalyst residue is removed, and polybutadiene is recovered by solidifying means such as steam stripping, etc. and dried.

By performing the process of this invention, formation of the gel is markedly inhibited during the polymerization, and adhesion of the gel to a polymerization reaction reactor, a stirrer or a piping is minimized, making possible the long-term continuous operation. Since the resulting polybutadiene is substantially gel-free, the usage of polybutadiene is not limited.

The following Examples and Comparative Examples illustrate this invention more specifically.

EXAMPLE 1

Two 250-liter stainless steel polymerization reactors each fitted with a stirrer, a cooling jacket and a reflux condenser were connected in series, and the continuous polymerization was carried out in the following manner.

A solution comprising benzene (solvent), n-butane (solvent) and 1,3-butadiene and having the 1,3-butadiene content of 13.5 % by weight was passed through a piping at a rate of 70 kg/hr, and 95 mmols/hr of 1,5-cyclooctadiene (a molecular weight modifier) and 35 mmols/hr of water passed through a stainless steel sintered filter having a pore diameter of 2 microns were added thereto and dispersed. The mixed solution was introduced into the polymerization reactor while further adding 120 mmols/hr of diethylaluminum monochloride (as a benzene solution). Cobalt octoate (0.9 mmol/hr) was added, and the continuous polymerization was carried out for 120 hours under such conditions that a temperature was 20° C. and a residence time was 2 hours. From the second reactor, the resulting cispolybutadiene solution was continuously withdrawn, and methanol containing an antioxidant was added thereto to completely stop the polymerization reaction. By steam stripping, cispolybutadiene was recovered and dried with hot air at 80° C. for 1 hour.

The gel content of cispolybutadiene and the state of adhesion of scales t the polymerization reactor were observed. The results are shown in Table 1. The gel content was evaluated in the following manner and shown as the number of gels.

Number of gels: Five grams of cispolybutadiene was dissolved in 250 ml of xylene and filtered in vacuo through a Buchner funnel having a diameter of 7 cm and fitted with a No. 2 filter paper (made by Toyo Roshi K.K.). After the filtration, the filter paper was dried at room temperature, and the number of gels each having a diameter of at least 0.1 mm and present on the filter paper was calculated with an unaided eye.

EXAMPLE 2

The continuous polymerization was carried out as in Example 1 except that an aqueous ethanol comprising water and ethanol at a molar ratio of 1:0.9 was used at such rate that the water content was 35 mmols/hr. The results are shown in Table 1.

EXAMPLES 3 to 6

The continuous polymerization was carried out as in Example 1 except that 1.0 mmol/hr of trimethyl phosphate (a gelation inhibitor) was added together with 1,5-cyclooctadiene (a molecular weight modifier) and 35 mmols/hr of water and 30 mmols/hr of methanol were added simultaneously through a stain less steel sintered filter.

Further, the continuous polymerization was conducted by varying the type of the gelation inhibitor as shown in Table 1. The results are shown in Table 1.

EXAMPLES 7 and 8

The continuous polymerization was performed as in Example 1 except that 2 mmols/hr of trimethyl orthoformate or dimethyl phenylphosphonate was added as the gelation inhibitor. The results are shown in Table 1.

COMPARATIVE EXAMPLE 1

The continuous polymerization was performed as in Example 1 except that water was added without being passed through the stainless steel sintered filter. The results are shown in Table 1.

COMPARATIVE EXAMPLE 2

The continuous polymerization was performed as in Comparative Example 1 except that trimethyl phosphate was added as the gelation inhibitor. The results are shown in Table 1.

TABLE 1

|  | Use of a sintered filter | Gelation inhibitor (mmol) | Conversion of polymerization (%) | Number of gels | State of adhesion of scales |
|---|---|---|---|---|---|
| Ex. 1 | Only water was passed. | — | 82 | 12 | A polybutadiene thin film was formed on a connecting pipe between a polymerization reactor, a stirring blade and a polymerization reactor. |
| Ex. 2 | A water-ethanol-mixture was passed. | — | 80 | 7 | A polybutadiene thin film was formed on said connecting pipe. |
| Ex. 3 | A water-methanol mixture was passed. | Trimethyl phosphate (0.0057) | 76 | 1 | Adhesion of scales was not obserbed in the polymerization reactor, the sterring blade and the connecting pipe. |
| Ex. 4 | A water-methanol mixture was passed. | N,N-diethylurea (0.012) | 78 | 2 | Adhesion of scales was not obserbed in the polymerization reactor, the sterring blade and the connecting pipe. |
| Ex. 5 | A water-methanol mixture was passed. | 2-Mercapto-benyothiazole (0.024) | 74 | 2 | Adhesion of scales was not obserbed in the polymerization reactor, the sterring blade and the connecting pipe. |
| Ex. 6 | A water-methanol mixture was passed. | Distearyl thiopropionate (0.036) | 80 | 5 | Adhesion of scales was not obserbed in the polymerization reactor, the sterring blade and the connecting pipe. |
| Ex. 7 | Only water was passed. | Trimethyl orthoformate (0.012) | 80 | 3 | Adhesion of scales was not obserbed in the polymerization reactor, the sterring blade and the connecting pipe. |
| Ex. 8 | Only water was passed. | Dimethyl phenylphosphonate | 76 | 4 | Adhesion of scales was not obserbed in the polymerization reactor, the sterring blade and the connecting pipe. |
| CEx. 1 | not used (only water) | — | 78 | 60 or more | Scales 3-4 mm in thickness were adhered to the reactor and the stirring blade, and the connecting pipe was clogged, so that the continuous polymerization was stopped in 50 hours. |
| CEx. 2 | not used (only water) | Trimethyl phosphate (0.0057) | 76 | 37 | Scales 3-4 mm in thickness were adhered to the reactor, the stirring blade and the connecting pipe, so that the continuous polymerization was stopped in 90 hours. |

(Notes)
Ex.: Example
CEx.: Comparative Example
The amount of the gelation inhibitor is an amount per mol of 1,3-butadiene. In all Examples and Comparative Examples, the cobalt catalyst and the aluminum catalyst were used in amounts of 0.005 mmol and 0.686 mmol per mol of 1,3-butadiene, respectively.

What we claim is:

1. In a process for producing cis-1,4-polybutadiene by polymerizing 1,3-butadiene in an inert organic polymerization solvent in the presence of a catalyst comprising a halogen-containing organoaluminum compound, a transition metal compound and water, the improvement wherein a necessary amount of water is passed through a porous filter having a pore diameter of 5 microns or less, and then dispersed in the polymerization solvent or a polymerization solvent solution of 1,3-butadiene.

2. The process of claim 1 wherein water is passed through the porous filter together with another inert organic solvent soluble in the inert organic polymerization solvent.

3. The process of claim 1 or 2 wherein at least one compound selected from a phosphoric acid triester compound, a phosphorous acid triester compound, a thiourea compound, a thiodipropionic acid diester compound, a thiol, an orthoester and a phenylphosphonic acid diester is added to the reaction system as a gelation inhibitor.

4. The process of claim 1 or 2 wherein the amount of water passed through the porous filter is from 0.1 to 0.8 mole per mole of the halogen-containing organoaluminum compound.

5. The process of claim 1 or 2 wherein the porous filter has a pore diameter of 2 microns or less.

* * * * *